United States Patent
Lee et al.

(10) Patent No.: US 9,246,563 B2
(45) Date of Patent: Jan. 26, 2016

(54) METHOD FOR TRANSMITTING DATA IN MULTI-USER WIRELESS COMMUNICATION SYSTEM

(75) Inventors: Yu-Ro Lee, Daejeon (KR); Jong-Ee Oh, Daejeon (KR); Sok-Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 73 days.

(21) Appl. No.: 13/504,925

(22) PCT Filed: Oct. 30, 2010

(86) PCT No.: PCT/KR2010/007573
§ 371 (c)(1),
(2), (4) Date: Apr. 27, 2012

(87) PCT Pub. No.: WO2011/053069
PCT Pub. Date: May 5, 2011

(65) Prior Publication Data
US 2012/0207097 A1    Aug. 16, 2012

(30) Foreign Application Priority Data

Oct. 30, 2009  (KR) .................. 10-2009-0104611

(51) Int. Cl.
*H04W 4/00* (2009.01)
*H04B 7/04* (2006.01)
*H04L 25/02* (2006.01)

(52) U.S. Cl.
CPC .......... *H04B 7/0452* (2013.01); *H04L 25/0204* (2013.01)

(58) Field of Classification Search
CPC .............. H04L 1/0003; H04L 25/0226; H04L 27/0008; H04W 24/10; H04W 4/06; H04W 88/06
USPC .................................................. 370/328, 343
See application file for complete search history.

(56) References Cited

U.S. PATENT DOCUMENTS

| | | | |
|---|---|---|---|
| 2005/0226348 A1* | 10/2005 | Jurgensen et al. | 375/303 |
| 2010/0284393 A1* | 11/2010 | Abraham et al. | 370/343 |
| 2010/0323739 A1* | 12/2010 | Wan et al. | 455/513 |
| 2011/0122825 A1* | 5/2011 | Lee et al. | 370/328 |

FOREIGN PATENT DOCUMENTS

| | | | |
|---|---|---|---|
| CN | 1943152 A | 4/2007 | |
| CN | 101272227 A | 9/2008 | |

(Continued)

OTHER PUBLICATIONS

Tomoya Tandai et al., "Cross-Layer-Optimized User Grouping Strategy in Downlink Multiuser MIMO Systems", 2009 IEEE 69th Vehicular Technology Conference, Apr. 29, 2009, pp. 1-6, IEEE.

(Continued)

*Primary Examiner* — Andrew Chriss
*Assistant Examiner* — Romani Ohri

(57) ABSTRACT

The present invention particularly relates to a method and an apparatus for improving the efficiency of data transmission in a multi-user wireless transmission system. According to one embodiment of the present invention, the method, which is a transmission method of data in a multi-user wireless communication system, comprises the steps of: estimating channel states of each terminal through sounding or feedback information received from the terminals, and selecting terminals to which individual data are to be transmitted at the same time; determining a signal to noise ratio of the selected terminals, and calculating a precoding matrix; calculating a modulation and coding scheme (MCS) of each terminal and the number of symbols of data fields in accordance with the MCS of each terminal; dividing an area according to the number of terminals to which the data fields are to be simultaneously transmitted, if there are two or more selected terminals; and recalculating a reception signal to interference and noise ratio (SINR) for each area of each terminal, configuring a packet by resetting the MCS according to the recalculated SINR, and transmitting the configured packet.

20 Claims, 10 Drawing Sheets

(56) References Cited

FOREIGN PATENT DOCUMENTS

| WO | WO2005081439 A1 | 9/2005 |
|---|---|---|
| WO | WO 2008095523 A1 * | 8/2008 |
| WO | WO 2011/010433 A1 | 1/2011 |

OTHER PUBLICATIONS

Brian Classon et al., "Multi-Dimensional Adaptation and Multi-User Scheduling Techniques for Wireless OFDM Systems", 2003 IEEE International Conference on Communications, May 15, 2003, pp. 2251-2255, vol. 3, IEEE.

Veljko Stankovic et al., "Generalized Design of Multi-User MIMO Precoding Matrices", IEEE Transactions on Wireless Communications, Mar. 2008, pp. 953-961, vol. 7 No. 3, IEEE.

International Search Report for PCT/KR2010/007573 filed on Oct. 30, 2010.

Written Opinion of the International Searching Authority for PCT/KR2010/007573 filed on Oct. 30, 2010.

* cited by examiner

METHOD FOR TRANSMITTING DATA IN MULTI-USER WIRELESS COMMUNICATION SYSTEM

TECHNICAL FIELD

Exemplary embodiments of the present invention relate to an apparatus and a method for transmitting data in a multi-user wireless transmission system; and, more particularly, to a method and an apparatus for improving data transmission efficiency in a multi-user wireless transmission system.

BACKGROUND ART

Recently, transmission schemes for higher transmission rates in wireless communication systems are being researched and standardized. In order to have such a high transmission rate in wireless LAN systems as well, a structure having a transmission rate of a maximum of 600 Mbps has been standardized, to which a MIMO system having multiple input/output in IEEE 802.11 TGn has been applied. There has been discussion in IEEE 802.11 VHTSG regarding a system having a maximum transmission rate of 1 Gbps at MAC SAP, and the task group of IEEE 802.11 TGac/TGad has been established accordingly. In order to maintain frequency efficiency while satisfying such a high transmission rate, the AP and STA must support more streams than four, which are supported by TGn, requiring a large number of antennas. In STA's terms, it is difficult to support a large number of antennas, considering the complexity or power consumption of the STA. Therefore, multi-user MIMO is being considered, according to which the AP simultaneously transmits to multiple STAs.

FIG. 1 illustrates an example of transmitting data to different STAs in a multi-user MIMO environment.

As illustrated in FIG. 1, according to multi-user MIMO, multiple STAs simultaneously transmit respective pieces of data, and the length of data transmitted by each STA varies depending on the supported service type or transmission rate. That is, each STA transmits a different length of data, as illustrated in FIG. 1, and in order to establish a transmission rule, data transmission needs to be performed as illustrated in (a) or (b).

Specifically, the starting point of each STA is brought into coincidence as in the case of (a) of FIG. 1. That is, each STA starts transmitting data at the same time of t0. Then, the ending point of each STA may fall on different times, such as t3 and t4, depending on the data type, service type, and transmission rate.

Alternatively, the ending point of each STA is brought into coincidence as in the case of (b) of FIG. 1. That is, each STA has the same ending point of t10, although they have different transmission starting points of t0, t1, and t2.

However, there has been proposed no method for transmitting, by each STA, data based on VHT wireless LAN system standards. Therefore, there is a need for a method for transmitting, by STAs, data most efficiently.

DISCLOSURE

Technical Problem

An embodiment of the present invention is directed to a method for reducing the error probability of data transmitted by each STA in a multi-user wireless transmission system.

Another embodiment of the present invention is directed to a method for transmitting data while being adaptive to interference in a wireless transmission system using a multi-user MIMO scheme.

Another embodiment of the present invention is directed to a method for transmitting data while being adaptive to the wireless channel in a wireless transmission system using a multi-user MIMO scheme.

TECHNICAL SOLUTION

In accordance with an embodiment of the present invention, a method for transmitting data by a base station capable of simultaneously communicating with at least two mobile stations in a multi-user wireless communication system includes: transmitting data to the at least two mobile stations simultaneously and, when data to be transmitted to each mobile station has a different size, differentiating an interval in which data is transmitted together to each mobile station in an identical time band; and configuring a data field by setting a different modulation and coding rate of the data field for each differentiated interval and transmitting the data field to each mobile station.

In accordance with another embodiment of the present invention, a method for transmitting data by a base station capable of simultaneously communicating with at least two mobile stations in a multi-user wireless communication system includes: configuring a header by inserting, into a control signal field, information regarding at least one repeated control field contained in a header of data transmitted simultaneously to each of the at least two mobile stations; and adding and transmitting a data field after the header containing the repeated field.

ADVANTAGEOUS EFFECTS

In accordance with the present invention, the MCS is modified, based on the degree of interference, in the PPDU of a data field inside a STA, thereby improving the data transmission rate in a multi-user wireless communication environment where multiple STAs make transmissions simultaneously. Repetition of a training field, a signal field, and a data field reduces the error probability of the signal and data field and improves reliability of transmitted data.

BEST MODE

Figure 1:
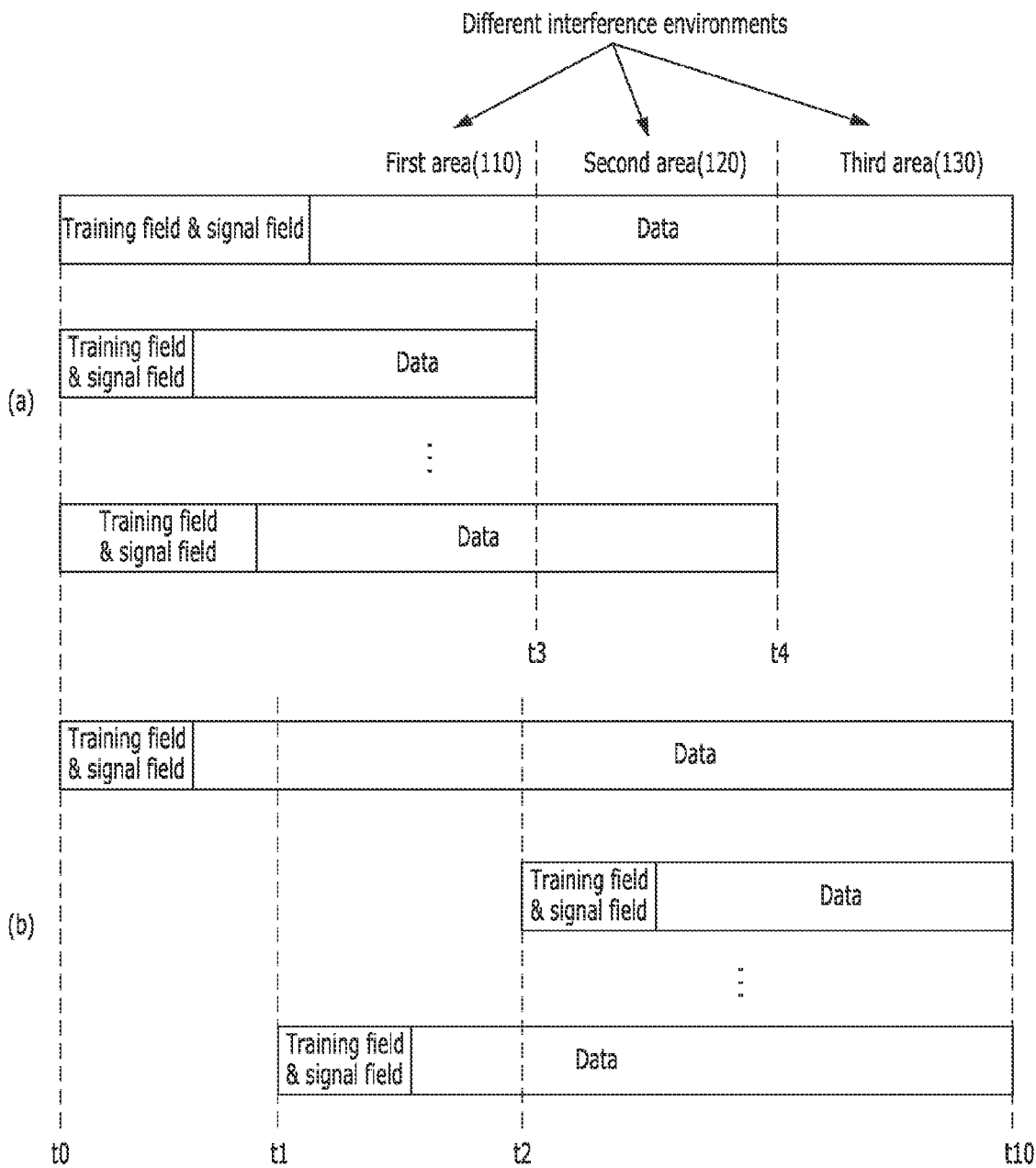
FIG. 1 illustrates an example of transmitting data to different STAs in a multi-user MIMO environment.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

When the number of simultaneously transmitting STAs is three, for example, as illustrated in FIG. 1, the interference varies depending on the number of simultaneously transmitting STAs within a data field.

For example, three STAs are simultaneously transmitting in a first area 110; two STAs are simultaneously transmitting in a second area 120; and one STA is transmitting in a third area 130. Therefore, it can be said that interference between STAs in the first area 110 is severer than that in the second area 120 or the third area 130, and interference in the third area 130 is less severe than that in the second area 120 or the first area 110.

Figure 2:
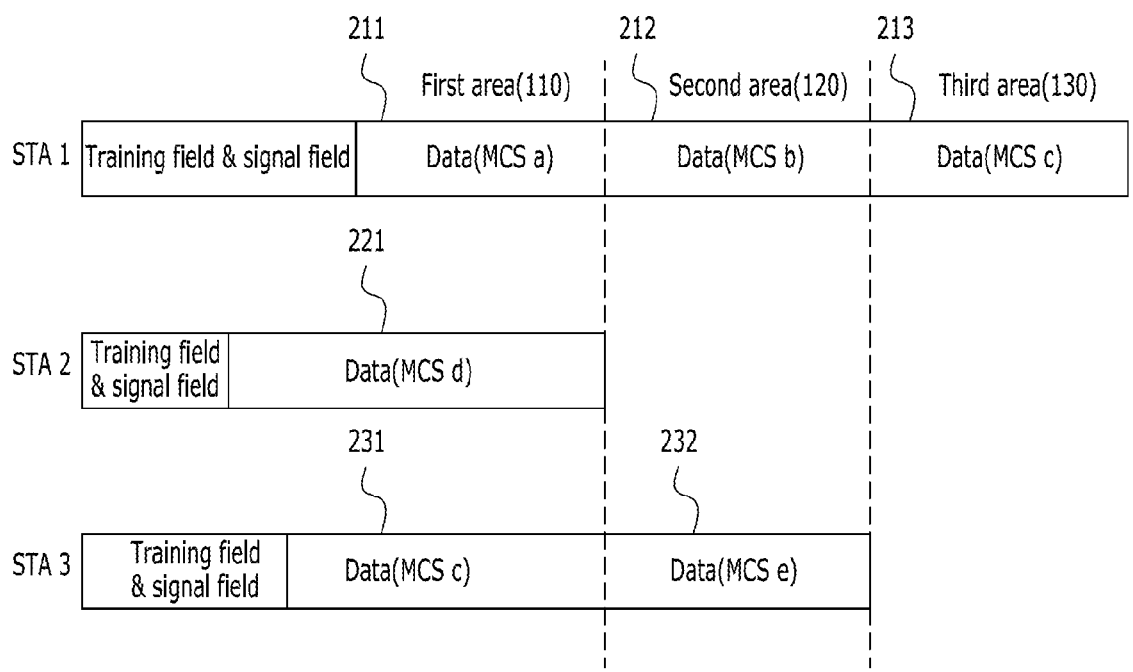
FIG. 2 illustrates an example of transmitting a PPDU in a multi-user MIMO environment in accordance with an embodiment of the present invention.

FIG. 2 illustrates an example of transmitting a PPDU in a multi-user MIMO environment in accordance with an embodiment of the present invention.

It has been assumed in the illustration of FIG. 2 that, as in the case of (a) of FIG. 1, the transmission starting point of every data coincides. However, it is to be noted that the same technique can be used in the case of (b).

In the first area 110, all STAs of STA1, STA2, and STA3 transmit data. Therefore, as described above, it corresponds to an environment having the severest interference. In the second area 120, only STA1 and STA3 transmit data, meaning that interference is less severe than the first area 110. In the third area 130, STA1 alone transmits data, meaning that interference is less severe than the second area 120.

In this case, STA1 needs to differentiate MCS a of data transmitted in the first area 110, MCS b of data transmitted in the second area 120, and MCS c of data transmitted in the third area 130. Specifically, data transmitted in the first area 110, i.e. MCS a, is given the lowest transmission rate; MCS b of data transmitted in the second area 120 is given the next lowest transmission rate; and MCS c of data transmitted in the third area 130 is given the highest transmission rate. The same transmission rates are applied to STA2 and STA3. However, it is to be noted that the MCSs of STA1, STA2, and STA3 may be equal or different, depending on data transmitted by respective STAs and channel environments.

When different MCSs are used in this manner, the AP needs to provide the STAs with information regarding the change of MCSs, which depends on the number of simultaneously transmitting STAs and the area where interference varies, through a control signal. In order to provide such information, the VHT signal field needs to contain modulation and coding information for each area.

Examples of containing such information will now be described.

(1) There is a method of indication using the modulation and coding scheme and the length. In this case, information can be expressed in one of the two following types.

{(Modulation Coding Scheme 1, HT length 1), . . . , (Modulation Coding Scheme K, HT length K)}

{(Modulation Coding Scheme 1, . . . , Modulation Coding Scheme K), . . . , {HT length 1), . . . , HT length K}}

(2) There is a method of indication using the modulation and coding scheme and the symbol length. In this case, information can be expressed in one of the two following types.

{(Modulation Coding Scheme 1, HT symbol length 1), . . . , (Modulation Coding Scheme K, HT symbol length K)}

{(Modulation Coding Scheme 1, . . . , Modulation Coding Scheme K), . . . , {HT symbol length 1), . . . , HT symbol length K}}

(3) There is a method of indication using the modulation and coding scheme and the symbol index corresponding to the start of each area. In this case, information can be expressed in one of the two following types.

{(Modulation Coding Scheme 1, HT symbol index 1), . . . , (Modulation Coding Scheme K, HT symbol index K)}

{(Modulation Coding Scheme 1, . . . , Modulation Coding Scheme K), . . . , {HT symbol index 1), . . . , HT symbol index K)}

Figure 3:
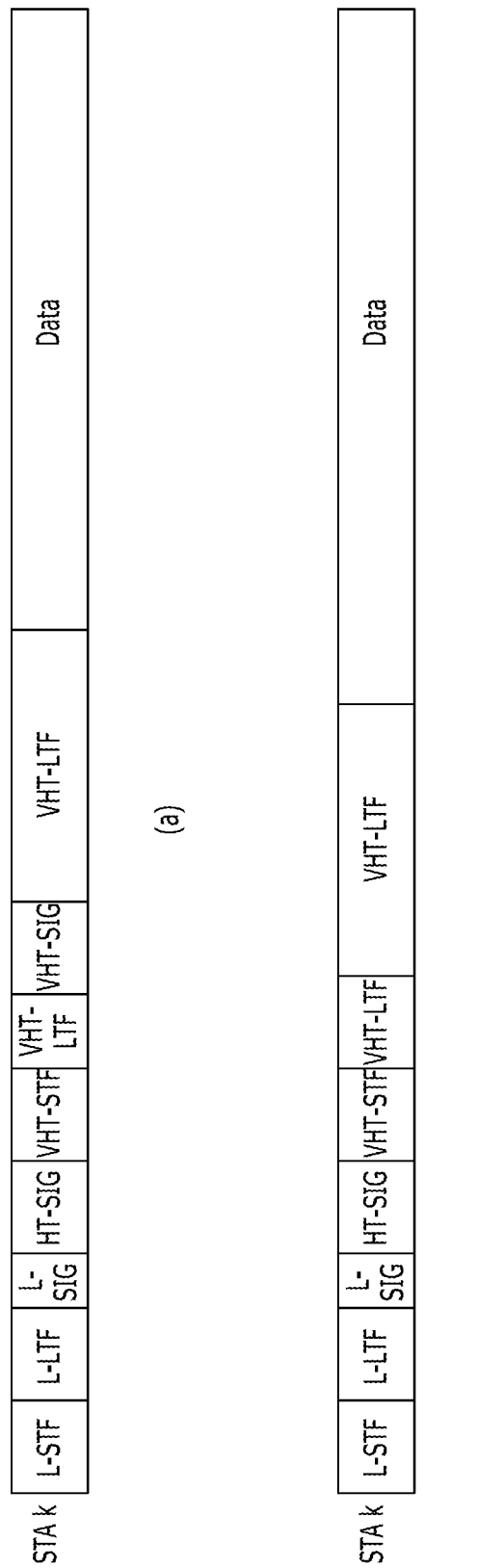
FIG. 3 illustrates an exemplary PPDU format of a VHT signal field when a packet has different MCSs in accordance with the present invention.

FIG. 3 illustrates an exemplary PPDU format of a VHT signal field when a packet has different MCSs in accordance with the present invention.

FIG. 3 illustrates two cases of (a) and (b). In the case of (a), a specific STA has a VHT-SIG field 310 positioned between VHT-LTFs; in the case of (b), a specific STA has a VHT-SIG field 320 positioned between a HT-SIG field and a VHT-STF.

It is clear from the two different cases illustrated in FIG. 3 that, during VHT frame transmission, the VHT signal field, i.e. VHT-SIG, needs no specific position in the PPDU format.

Figure 4:
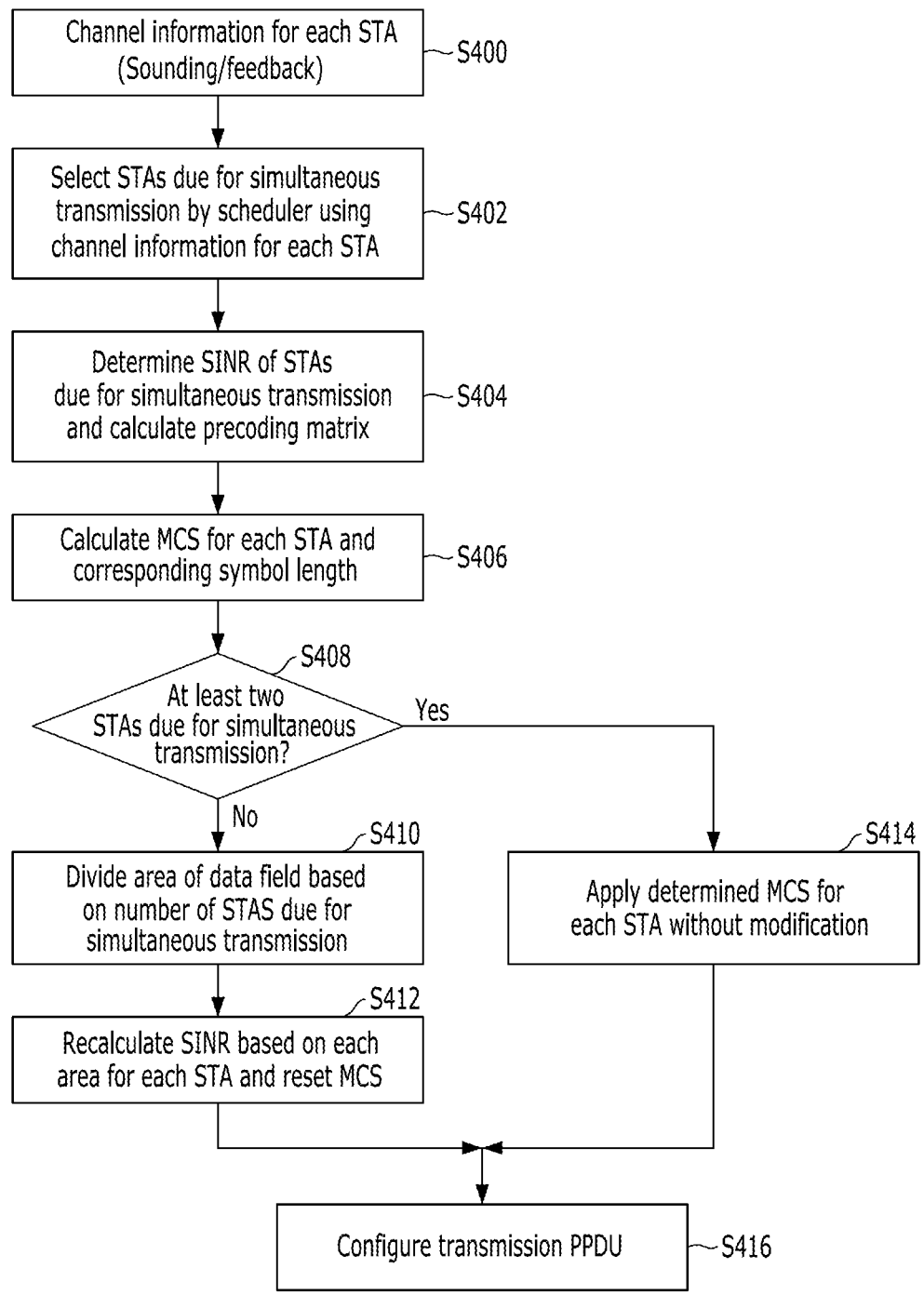
FIG. 4 is a flowchart illustrating a process of determining the configuration of a PPDU in accordance with an exemplary embodiment of the present invention.

FIG. 4 is a flowchart illustrating a process of determining the configuration of a PPDU in accordance with an exemplary embodiment of the present invention.

The AP estimates the channel state for each STA through feedback or sounding at step 400. The AP proceeds to step 402 and, based on channel information for each STA, selects STAs, to which the scheduler is to transmit data frames simultaneously. After selection of STAs to which data frames are to be transmitted simultaneously, the AP proceeds to step 404 and determines the SINR of the selected STAs and calculates a precoding matrix. Calculation of the precoding matrix is for the purpose of calculating the overall amount of data that can be transmitted.

The AP proceeds to step 406 and calculates the MCS of each STA and the number of symbols of the data field based on the MCS of each STA. The AP proceeds to step 408 and checks if data frames can be transmitted simultaneously to two STAs. When it is configured as a result of the checking that data frames can be transmitted simultaneously to at least two STAs, the AP proceeds to step 410 and, if not, proceeds to step 414.

Upon proceeding to step 410, i.e. when data frames can be transmitted simultaneously to at least two STAs, the AP divides the area of the data field based on the number of simultaneously transmittable STAs. Such area division is for the purpose of identifying an interval, in which different data frames are overlapped and transmitted as described with reference to FIGS. 1 and 2.

After dividing respective data frames transmitted to different STAs, the AP proceeds to step 412 and recalculates the SINR for each STA and for each area, as described with reference to FIGS. 1 and 2. After recalculating the SINR, the AP resets the corresponding MCS and proceeds to step 416.

When it is confirmed as a result of checking at the step 408 that a data frame can be transmitted to only one STA, not at least two STAs, the AP proceeds to step 414, applies the determined MCS for each STA without modification, and proceeds to step 416.

After proceeding to step 416 from step 412 or 414, the AP determines PPDU configuration based on the determined MCS and length information, as described with reference to FIG. 3. The AP then configures a PPDU format based on the determined mode and transmits it.

As a method for improving transmission efficiency, the PPDU of a STA, which transmits a short PPDU, can be repeated to reduce the probability of errors. A method for repeating a PPDU and reducing error probability will now be described.

Figure 5:
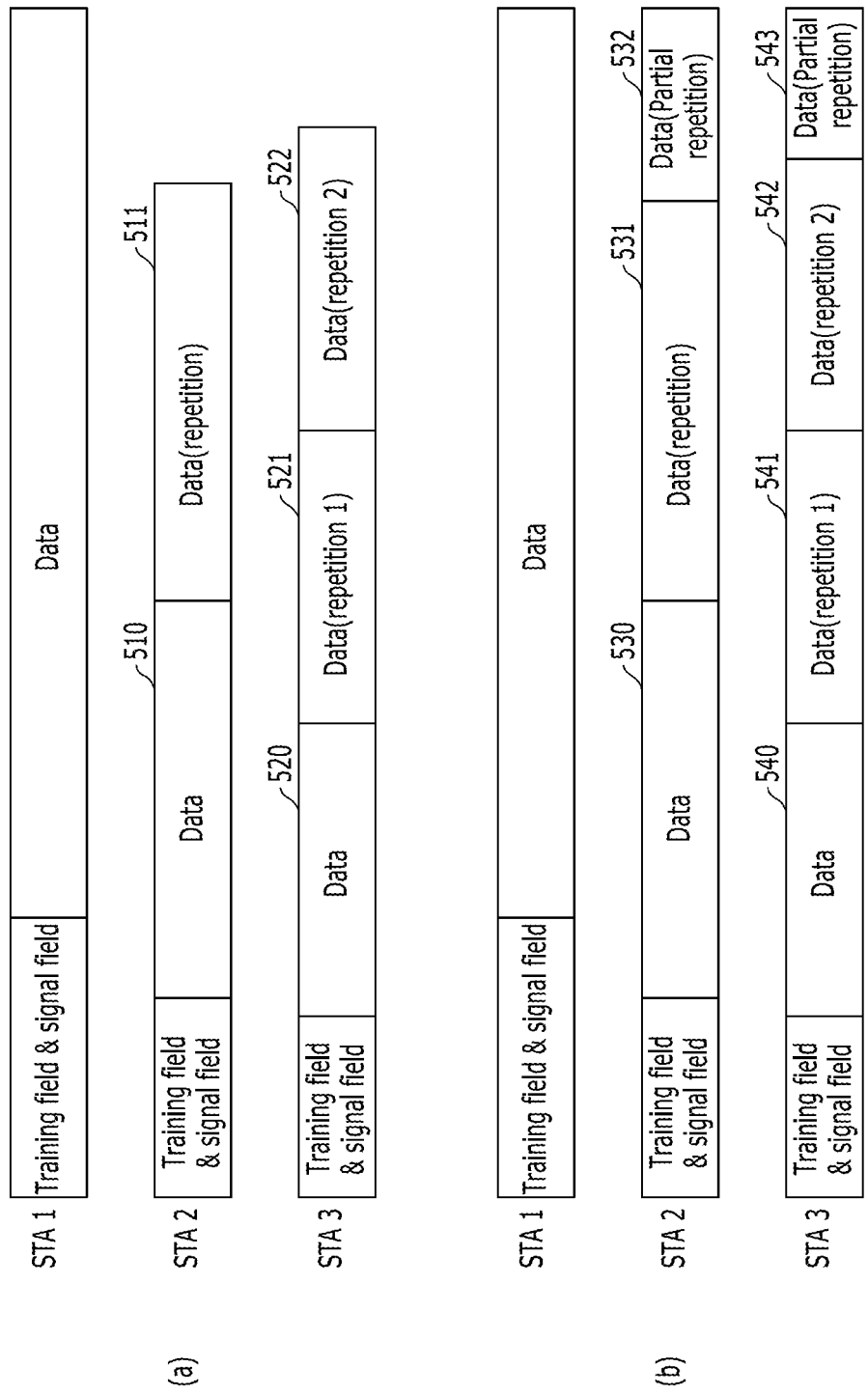
FIG. 5 illustrates an example of repeating a data field of a PPDU in accordance with the present invention.

FIG. 5 illustrates an example of repeating a data field of a PPDU in accordance with the present invention.

FIG. 5 illustrates two cases for repeating the data field of a PPDU in accordance with the present invention, based on the case of FIG. 2 described above. Specifically, in the first case of (a), the data field of the PPDU is repeated integer times and, in the case of (b), the data field is repeated partially so that its length equals that of a PPDU which is the longest. Each case will now be described.

In the case of (a), a repetition data field 511, which has the same size as the data field 510 of STA2, is repeated to be continuous. This is the same as in the case of STA3. That is, a shorter data field 520 is included in the case of STA3, and a first repetition data frame 521 and a second repetition data frame 522 are transmitted continuously.

In the case of (b), the data field of STA1, which is the longest, serves as the reference. Specifically, in the case of STA2, the data field 530 is followed by a first repetition data field 531 of the same size, and a second repetition data field 532 is positioned, which is partially repeated. The same is applied to the case of STA3. Specifically, the data field 540 transmitted to STA3 is followed by first and second repetition data fields 541 and 542, which are full repetitions of the data field 540, and by a third repetition data field 543, which is a partial repetition of the data field.

When a data field is transmitted by one of the two above-described methods, the receiver needs to store the unit of the repeated data field. It is also possible to adopt symbol-based repetition in order to reduce the storage size. Cases of symbol-based repetition will now be described.

Figure 6:
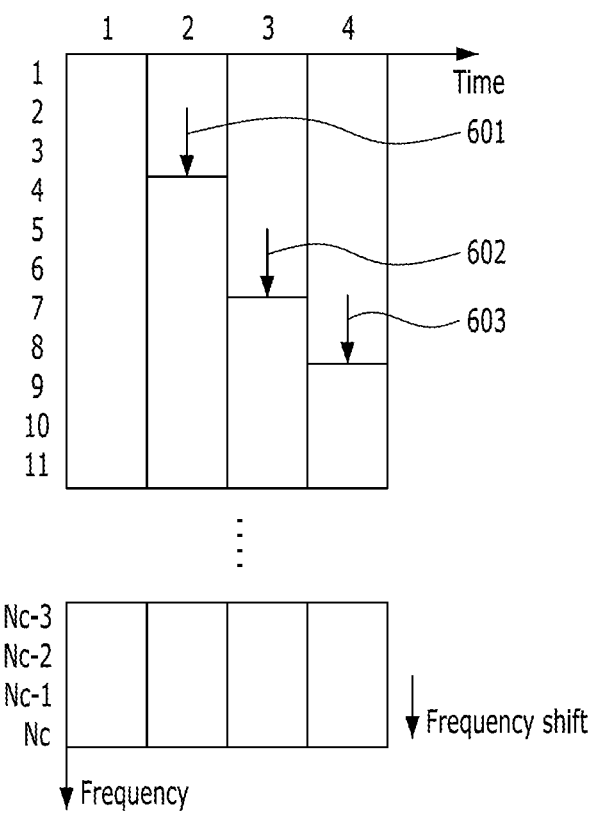
FIG. 6 illustrates an example of frequency shift between symbols when a data field is repeated symbol by symbol in accordance with an embodiment of the present invention.

FIG. 6 illustrates an example of frequency shift between symbols when a data field is repeated symbol by symbol in accordance with an embodiment of the present invention.

In FIG. 6, the horizontal axis represents time, and the vertical axis represents frequency. In FIG. 6, the first symbol is transmitted without modification, and the first repetition frame is shifted as much as a predetermined partial first frequency shift value 601. The second repetition frame is shifted as much as the first frequency shift value 601 of the first repetition frame, and then shifted as much as a predetermined second frequency shift value 602. The third repetition frame is, after being shifted as much as the second frequency shift value 602 of the second repetition frame, shifted as much as a predetermined third frequency shift value 603.

The first, second, and third frequency shift values 601, 602, and 603 may be identical to, or different from one another. When all of these values are 3, for example, the first repetition frame is frequency-shifted from the original data symbol as much as 3, and the second repetition frame is frequency-shifted from the original data symbol as much as 6.

The above-mentioned frequency shift also gives the advantage of diversity gain.

Repetition of data in the above-mentioned manner requires that relevant information be transmitted through a control signal. Methods for informing of data repetition through a control signal will now be described.

(1) Integer-times repetition can be made known through a control signal including the following information:

The repetition method is made known. For example, information indicating repetition of the data field or symbol needs to be included.

Repetition number information needs to be included.

Frequency shift index information needs to be included.

(2) Partial repetition can be made known through a control signal including the following information.

The repetition method is made known. For example, information indicating repetition of the data field or symbol needs to be included.

Repetition number information needs to be included.

Frequency shift index information needs to be included.

Information regarding the number of partial repetition symbols needs to be included.

A PPDU format including VHT-SIG for transmitting the above-mentioned control signal can be transmitted in a format as described with reference to FIG. 3.

Other methods for improving transmission efficiency will now be described.

Figure 7:
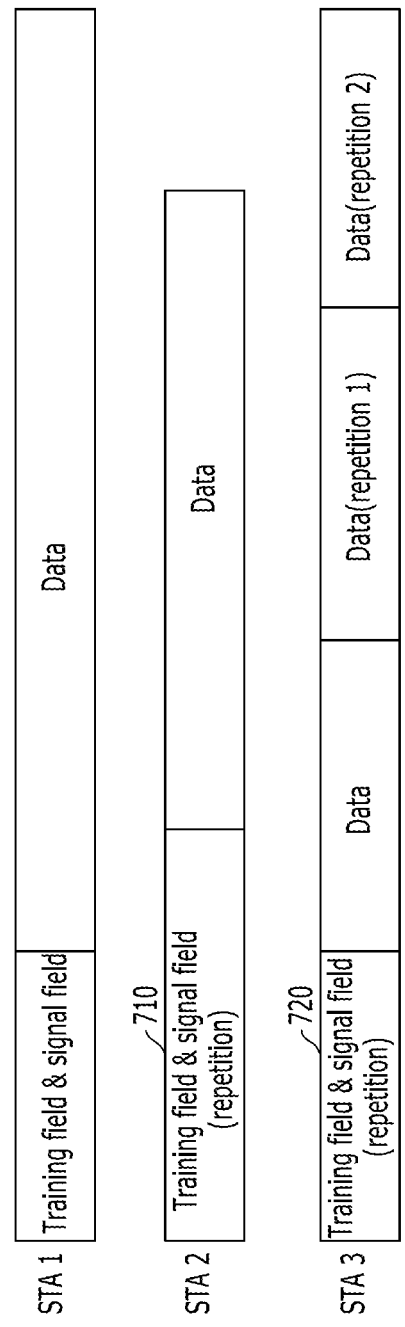
FIG. 7 illustrates an example of repeating a training field and/or a signal field in order to improve transmission efficiency in accordance with an embodiment of the present invention.

FIG. 7 illustrates an example of repeating a training field and/or a signal field in order to improve transmission efficiency in accordance with an embodiment of the present invention.

FIG. 7 illustrates repetition of a training field and/or a signal field 710 and 720 in the case of STA2 and STA3. There is no repeated data field in the case of STA1 and STA2. The data field is repeated twice in the case of STA3. The training field and/or signal field 710 and 720 can be repeated integer times or partially as in the case of the data field. Such repetition of the training field and/or signal field 710 and 720 requires that the control signal, i.e. VHT-SIG, include the following information.

(1) In the case of integer-times repetition

LTF repetition information needs to be included.

In this case, information regarding the repetition method, e.g. LTF-based repetition, symbol-based repetition, needs to be included, and repetition number information needs to be included.

VHT-SIG repetition information needs to be included.

In this case, information regarding the repetition method, e.g. VHT-SIG-based repetition, symbol-based repetition, needs to be included, repetition number information needs to be included, and the frequency shift index needs to be included.

(2) In the case of partial repetition

LTF repetition information needs to be included.

In this case, information regarding the repetition method, e.g. LTF-based repetition, symbol-based repetition, needs to be included, repetition number information needs to be included, and information regarding the number of partial repetition symbols needs to be included.

VHT-SIG repetition information needs to be included.

In this case, information regarding the repetition method, e.g. VHT-SIG-based repetition, symbol-based repetition, needs to be included, repetition number information needs to be included, frequency shift index information needs to be included, and information regarding the number of partial repetition symbols needs to be included.

Figure 8:
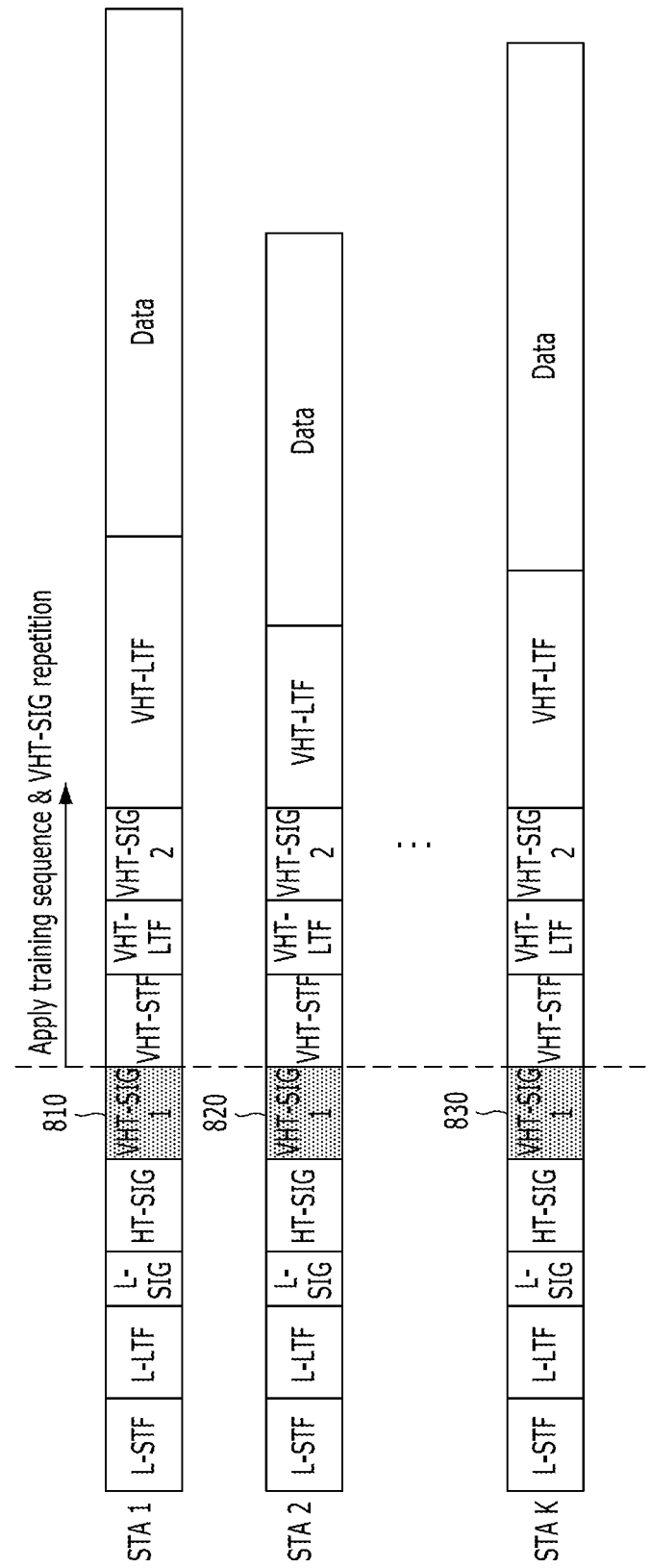
FIG. 8 illustrates an exemplary configuration of a PPDU when its training field and VHT-SIG are repeated in accordance with another embodiment of the present invention.

FIG. 8 illustrates an exemplary configuration of a PPDU when its training field and VHT-SIG are repeated in accordance with another embodiment of the present invention.

As illustrated in FIG. 8, STA1, STA2, and STAk include VHT-SIG1 fields 810, 820, and 830, respectively, which are followed by information regarding repetition of a training sequence and a VHT-SIG. When only the training field is repeated in such VHT-SIG1 fields 810, 820, and 830, the control signals, i.e. respective VHT-SIG1 810, 820, and 830 need to include the following information:

(1) In the case of integer-times repetition

Information regarding the repetition method needs to be included, e.g. LTF-based repetition, symbol-based repetition.

Repetition number information needs to be included.

(2) In the case of partial repetition

Information regarding the repetition method needs to be included, e.g. LTF-based repetition, symbol-based repetition.

Repetition number information needs to be included.

Information regarding the number of partial repetition symbols needs to be included.

Figure 9:
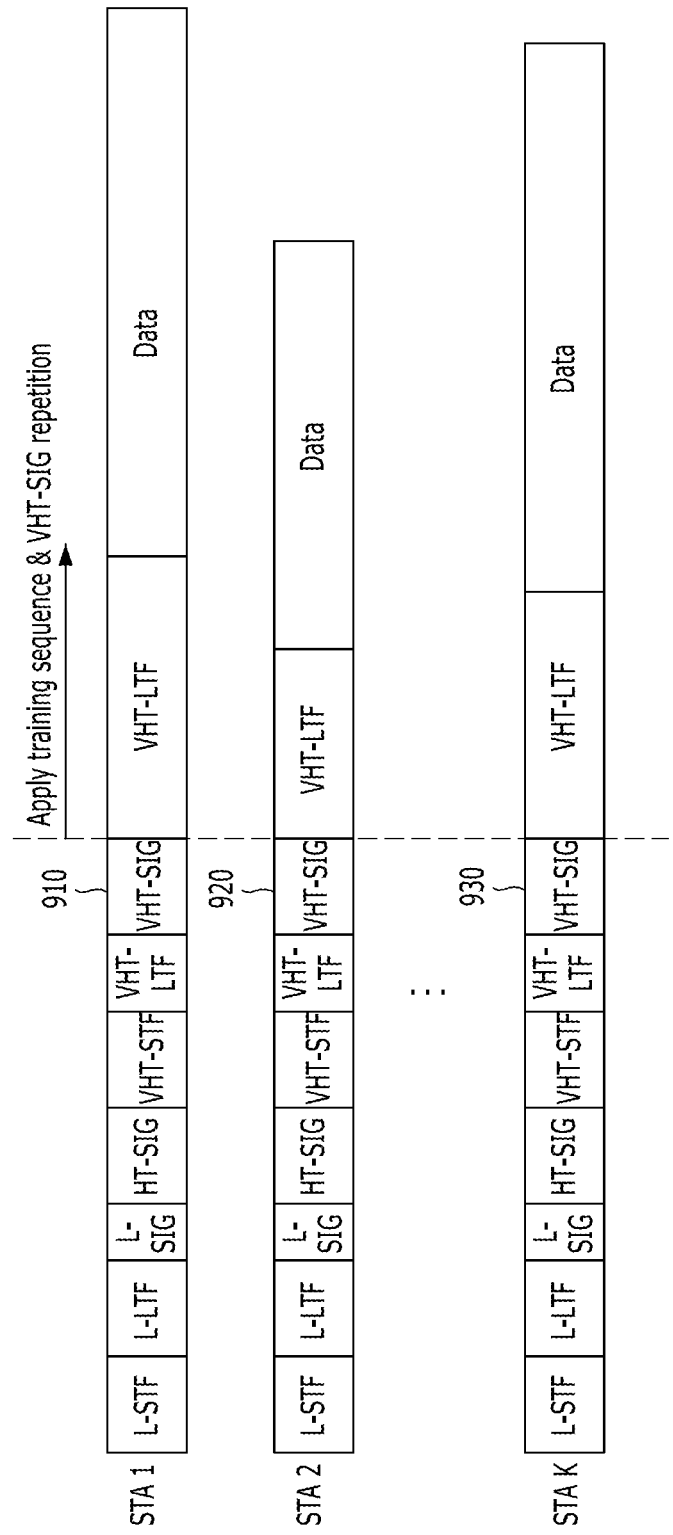
FIG. 9 illustrates an exemplary configuration of a PPDU when its training field is repeated in accordance with still another embodiment of the present invention.

FIG. 9 illustrates an exemplary configuration of a PPDU when its training field is repeated in accordance with still another embodiment of the present invention.

As illustrated in FIG. 9, in the frames transmitted to STA1, STA2, ..., STAk, control signals preceding repeated training fields, i.e. VHT-SIG fields 910, 920, and 930, can be used to transmit information regarding repetition of training fields for respective STAs after the VHT-SIGs.

Figure 10:
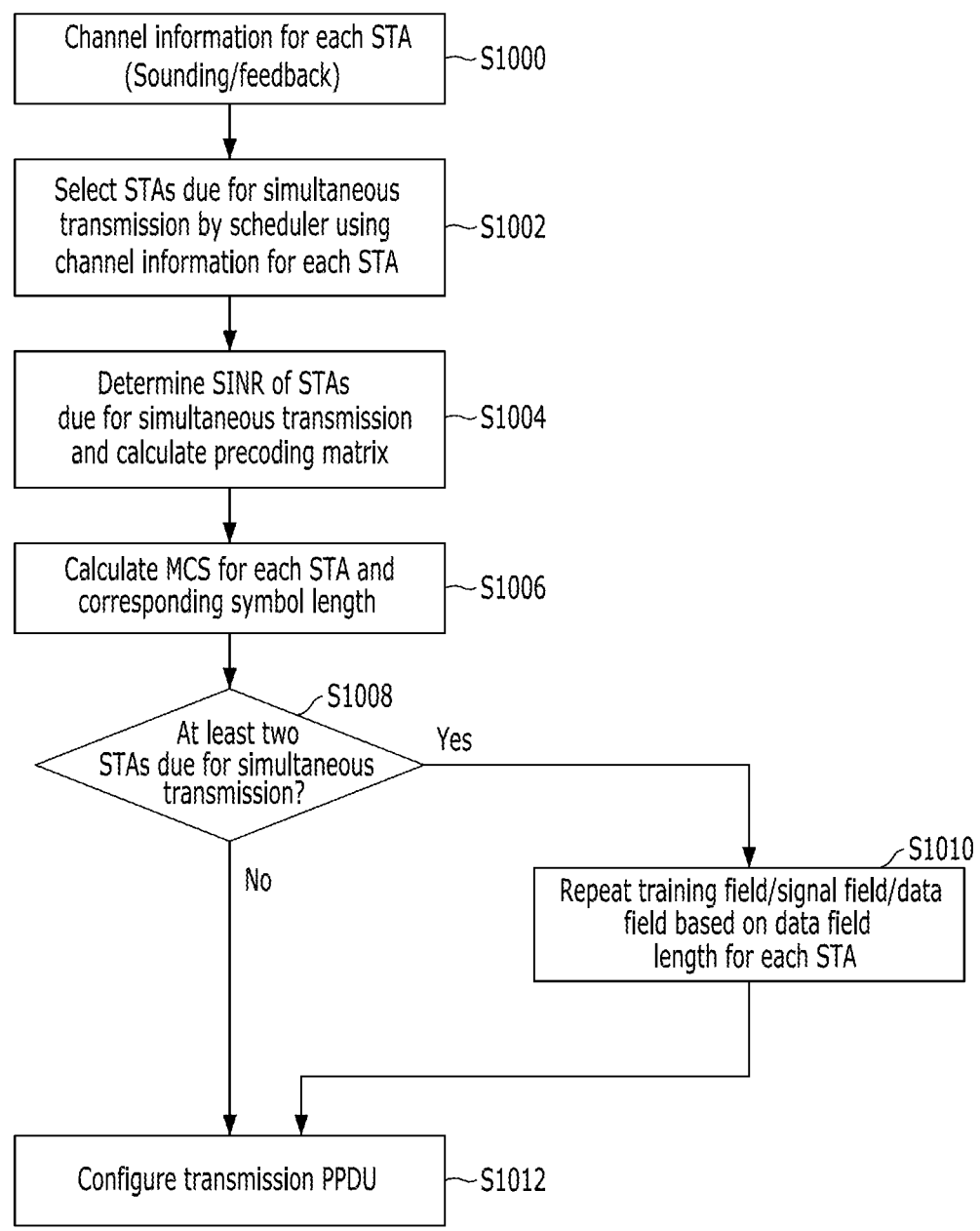
FIG. 10 is a control flowchart illustrating a process of configuring a PPDU to be transmitted in accordance with an embodiment of the present invention.

FIG. 10 is a control flowchart illustrating a process of configuring a PPDU to be transmitted in accordance with an embodiment of the present invention.

The AP estimates the channel state for each STA through feedback or sounding at step 1000. The AP proceeds to step 1002 and, based on the channel information for each STA, selects STAs to which the scheduler is to transmit simultaneously. The AP proceeds to step 1004 and determines the SINR of the selected STAs due for simultaneous transmission, and calculates a precoding matrix, which is for the purpose of calculating the overall amount of data that can be transmitted. The AP proceeds to step 1006 and calculates the symbol length from the MCS determined for each STA.

The AP proceeds to step 1008 and checks if the number of STAs selected for data frame transmission is at least two. When it is confirmed as a result of checking at the step 1008 that data frames are transmitted to at least two STAs, the AP proceeds to step 1010 and, if not, proceeds to step 1012.

When data frames are transmitted to at least two STAs, the AP proceeds to step 1010 and determines, based on the length of data field for each STA, repetition of a training field, a signal field, and a data field, and proceeds to step S1012.

Proceeding directly from step 1008 to 1012 means that a data frame is transmitted to only one STA, and proceeding from step 1010 to 1012 means that data frames are transmitted to at least two STAs. Therefore, upon proceeding to step 1012, the AP configures a PPDU to be transmitted in conformity with each case, and transmits it.

While the present invention has been described with respect to the specific embodiments, it will be apparent to those skilled in the art that various changes and modifications may be made without departing from the spirit and scope of the invention as defined in the following claims.

[Industrial Applicability]

The present invention is applicable to configuring data transmitted in a high-speed wireless communication system.

The invention claimed is:

1. A method for transmitting data by a base station capable of simultaneously communicating with at least two mobile stations in a multi-user wireless communication system, the method comprising:

when data of data frames to be transmitted to the at least two mobile stations have different sizes, differentiating between areas in which the data are transmitted to the at least two mobile stations; and configuring data fields being included in each of the data frames by setting different modulation and coding rates for the differentiated areas, configuring the data frames including the data fields being transmitted to the at least two mobile stations in the differentiated areas, and simultaneously transmitting the data frames corresponding to the at least two mobile stations, wherein the data fields transmitted in each of the differentiated areas are set different modulation and coding rates according to a degree of interference between the at least two mobile stations in the differentiated areas, wherein the degree of interference is determined according to a count of the data fields transmitted to the at least two mobile stations within an identical area among the differentiated areas, and wherein a control signal field included in each of the data frames includes information for the different modulation and coding rates of the data fields and information for a length of the data frames.

2. The method of claim 1, wherein in the configuring of the data fields, setting the modulation and coding rate includes estimating a channel state of each of the at least two mobile stations based on feedback information or sounding information from said each of the at least two mobile stations.

3. The method of claim 2, further comprising:

calculating a precoding matrix using the channel state; and calculating a symbol length using the calculated precoding matrix when the different modulation and coding rates are determined by the data fields.

4. The method of claim 1, further comprising:

when data is transmitted to only one mobile station, transmitting the data using a modulation and coding rate determined based on a channel state of the only one mobile station to which the data is transmitted.

5. The method of claim 1, wherein, when the data are to be transmitted simultaneously to the at least two mobile stations, transmission start points of the data frames to be transmitted to the at least two mobile stations are brought into coincidence.

6. The method of claim 5, wherein, when the data having different sizes are transmitted simultaneously to the at least two mobile stations, a length of a data frame having the longest data is used as a reference length, and at least one field among fields included in other data frames is repeated within the reference length.

7. The method of claim 6, wherein the at least one field is repeated as a frequency-shifted field that is frequency-shifted by a predetermined frequency shift value.

8. The method of claim 6, wherein the repeated field and information on repetition of the repeated field are included in the control signal field, and are transmitted to the at least two mobile stations.

9. The method of claim 6, wherein at least one field among fields included in other data frames is repeated an integer number times so that the data frames are transmitted within the reference length.

10. The method of claim 9, wherein the at least one field is repeated as a frequency-shifted field that is frequency-shifted by a predetermined frequency shift value.

11. The method of claim 9, wherein the repeated field and information on repetition of the repeated field are included in the control signal field, and are transmitted to the at least two mobile stations.

12. The method of claim 1, wherein, when data is transmitted simultaneously to the at least two mobile stations, transmission end points of frames are brought into coincidence.

13. A method for transmitting data by a base station capable of simultaneously communicating with at least two mobile stations in a multi-user wireless communication system, the method comprising:
configuring a header of a data frame transmitted to each of the at least two mobile stations by inserting, into a control signal field, information on at least one field that is repeated among fields included in the header, when data of data frames are transmitted simultaneously to the at least two mobile stations; and
adding a data field after the header, respectively configuring the data frame including the header and the data field for the at least two mobile stations, and simultaneously transmitting the data frames corresponding to the at least two mobile stations,
wherein the control signal field includes information for field-based repetition, symbol-based repetition, repetition number information, and frequency shift index regarding repetition of the at least one field.

14. The method of claim 13, wherein the at least one field is repeated as a frequency-shifted field that is frequency-shifted by a predetermined frequency shift value.

15. The method of claim 13, wherein, when the data field is repeated, information on the repeated data field is added to the control signal field.

16. The method of claim 13, wherein the field repeated in the header is a training field.

17. The method of claim 13, wherein the field repeated in the header is a signal field.

18. The method of claim 13, wherein, the repeated field is repeated an integer number times.

19. The method of claim 6, wherein the control signal field includes information for field-based repetition, symbol-based repetition, repetition number information, and frequency shift index regarding repetition of the at least one field.

20. The method of claim 11, wherein the control signal field includes information for field-based repetition, symbol-based repetition, repetition number information, and frequency shift index regarding repetition of the at least one field.

* * * * *